United States Patent [19]
Wakasa et al.

[11] Patent Number: 5,789,713
[45] Date of Patent: Aug. 4, 1998

[54] WEIGHING APPARATUS AND METHOD COMPENSATING FOR WEIGHING ERRORS

[75] Inventors: Yukio Wakasa; Shoko Tajiri, both of Shiga, Japan

[73] Assignee: Ishida Co., Ltd., Kyoto, Japan

[21] Appl. No.: 684,913

[22] Filed: Jul. 25, 1996

[30] Foreign Application Priority Data

Jul. 26, 1995 [JP] Japan .................................. 7-211010

[51] Int. Cl.$^6$ ............................................................. G01G 3/00
[52] U.S. Cl. ....................................... 177/25.13; 177/185
[58] Field of Search ............................ 177/25.13, 185

[56] References Cited

U.S. PATENT DOCUMENTS

| | | | |
|---|---|---|---|
| 4,212,361 | 7/1980 | Stocker | 177/185 |
| 4,593,778 | 6/1986 | Konishi et al. | 177/185 |
| 4,624,331 | 11/1986 | Naito | 177/185 |
| 4,751,973 | 6/1988 | Freeman et al. | 177/185 |
| 4,926,359 | 5/1990 | Konishi et al. | 177/185 |
| 5,117,929 | 6/1992 | Nakamura et al. | 177/185 |
| 5,436,858 | 7/1995 | Staver | 364/724.1 |
| 5,440,077 | 8/1995 | Konishi et al. | 177/185 |
| 5,627,746 | 5/1997 | Ziegler, Jr. et al. | 364/148 |
| 5,650,951 | 7/1997 | Staver | 364/724.1 |

FOREIGN PATENT DOCUMENTS

| | | |
|---|---|---|
| 0 122 796 A | 10/1984 | European Pat. Off. . |
| 0 430 695 A | 6/1991 | European Pat. Off. . |
| 0 430 695 B1 | 9/1994 | European Pat. Off. . |
| 0 622 617 A | 11/1994 | European Pat. Off. . |
| 0 622 617 A1 | 11/1994 | European Pat. Off. . |
| 2 418 451 A | 9/1979 | France . |

OTHER PUBLICATIONS

Patent Abstracts of Japan, vol. 009, No. 054 (P–340), 8 Mar. 1985, & JP 59 190628 A (Ishida Kouki Seisakusho:KK), 29 Oct. 1984, *abstract*.

*Primary Examiner*—Michael L. Gellner
*Assistant Examiner*—Randy W. Gibson
*Attorney, Agent, or Firm*—Staas & Halsey

[57] ABSTRACT

A weighing method and apparatus includes a weighing cell for weighing an article and outputting a weighing signal corresponding to the weight thereof and a floor vibration detecting cell for detecting vibration of a floor on which the weighing cell is installed and for outputting a floor vibration detection signal. The weighing signal and the floor vibration detection signal are selectively sampled at a predetermined sampling frequency and an A/D converter converts each of the sampled signals into a digital weighing signal or a digital floor vibration detection signal, respectively. A first digital filter filters the digital weighing signal and a second digital filter filters the digital floor vibration detection signal. A floor vibration compensator subtracts the filtered digital floor vibration detection signal from the filtered digital weighing signal and outputs a floor vibration compensated signal wherein an error of the weighing signal caused by the floor vibration is compensated for. A phase corrector nullifies a phase difference, caused by a difference in the times at which the weighing signal and the floor vibration detection signal are sampled, by applying a suitable correction, corresponding to the phase difference, to the weighing signal or the floor vibration detection signal before or after filtering.

19 Claims, 12 Drawing Sheets

WEIGHING APPARATUS AND METHOD COMPENSATING FOR WEIGHING ERRORS

BACKGROUND OF THE INVENTION

1. Field of the Invention

The present invention relates to a weighing method and apparatus, and more particularly, to a weighing method and apparatus which compensates for weighing errors due to a low frequency vibration component of a floor on which a weighing cell is installed.

2. Description of the Related Art

Generally, in a factory production line, when weighing articles to be weighed, mechanical vibration occurs when the articles to be weighed are loaded onto a weighing apparatus and floor vibration, originating in the environment such as the ground, a building, a floor or a frame, occurs. These vibrational components are superimposed on the weighing signal. This weighing signal with the superimposed vibrations is digitized at a predetermined sampling frequency by an A/D converter and filtered by a digital filter (CPU) and the mechanical vibration component thereof is thereby removed. However, because the frequencies of floor vibration components are generally lower than those of mechanical vibration components, it is necessary for the cutoff frequency of the digital filter to be set low if this is also to remove the floor vibration components. When this is done, however, the filtering time becomes long and the weighing speed falls.

To avoid these problems, a weighing apparatus having a floor vibration compensating (AFV: Anti-Floor Vibration) function for removing a floor vibration component by separate correction is used. In this weighing apparatus, a floor vibration detecting cell which outputs a floor vibration detection signal is disposed in the vicinity of the weighing cell and on the same floor as the weighing cell. This floor vibration detection signal is digitized by an A/D converter and filtered by a digital filter (CPU) whereby mechanical vibration is removed. The floor vibration compensation (AFV) for removing the floor vibration component from the weighing signal is carried out by subtracting the filtered floor vibration signal from the filtered weighing signal. In this way, setting the cutoff frequency of the digital filter high is made possible and the realization of high-speed weighing is promoted.

It is desirable to make the apparatus small and low-cost. Therefore, a single A/D converter has been used to which the weighing signal of the weighing side and the floor vibration detection signal of the AFV side have been selectively fed for digitization using channel changeover. This is described in EP-A-0430695. However, in this conventional apparatus, because a single A/D converter is used, the weighing side and the AFV side cannot be sampled at the same time. Thus, the sampling timing of the two signals differs and consequently, a phase difference arises between the two signals. Therefore, there has been the problem that because floor vibration compensation is carried out with a phase difference existing, the conventional apparatus lacks accuracy and does not promote high-precision weighing.

SUMMARY OF THE INVENTION

It is therefore an object of the present invention to provide a high-precision weighing apparatus and method.

It is a further object of the present invention to promote high-precision weighing even when using a single A/D converter and a phase difference caused by a gap in sampling timing of a weighing signal and a floor vibration detection signal arises.

The above objects are achieved in accordance with the present invention by providing a weighing method and apparatus including a weighing cell for weighing an article to be weighed and outputting a weighing signal corresponding to the weight thereof; a floor vibration detecting cell for detecting vibration of a floor on which the weighing cell is installed and for outputting a floor vibration detection signal; a sampling circuit for selectively sampling the weighing signal and the floor vibration detection signal at a predetermined sampling frequency; an A/D converter for converting each of the sampled signals into a digital weighing signal or a digital floor vibration detection signal, respectively; a first digital filtering circuit for filtering the digital weighing signal; a second digital filtering circuit for filtering the digital floor vibration detection signal; a floor vibration compensating circuit for subtracting the filtered digital floor vibration detection signal from the filtered digital weighing signal and outputting a floor vibration compensated signal wherein an error of the weighing signal caused by floor vibration is compensated for; and a phase correcting circuit for nullifying a phase difference, caused by a difference in the times at which the weighing signal and the floor vibration detection signal are sampled, by applying a suitable correction, corresponding to the phase difference, to the weighing signal or the floor vibration detection signal before or after filtering.

The sampling circuit and A/D converter may be separate components, but alternatively they may be provided with a common digital converter.

Thus, the phase correcting circuit causes a phase difference caused by a gap in the timing of the sampling of the weighing signal and the floor vibration detection signal in the A/D converter to be nullified by applying a phase gap equivalent to this phase difference to the weighing signal or the floor vibration detection signal. Therefore, because the phase difference arising due to the sampling timing gap of the weighing signal and the floor vibration detection signal ceases to exist, it is possible to increase the accuracy of floor vibration compensation when the floor vibration detection signal is subtracted from the weighing signal.

Typically, the sampling circuit alternately samples the weighing signal and the floor vibration detection signal.

Preferably, the phase correcting circuit nullifies the phase difference caused by the gap of sampling timing by simple-averaging the sampled weighing signal or floor vibration detection signal. This is particularly suitable where each signal is sampled for substantially the same time and at substantially the same frequency.

According to the construction described above, by the alternately sampled weighing signal or floor vibration detection signal being simple-averaged by the phase correcting means, it is possible to easily nullify the phase difference caused by the gap in sampling timing.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
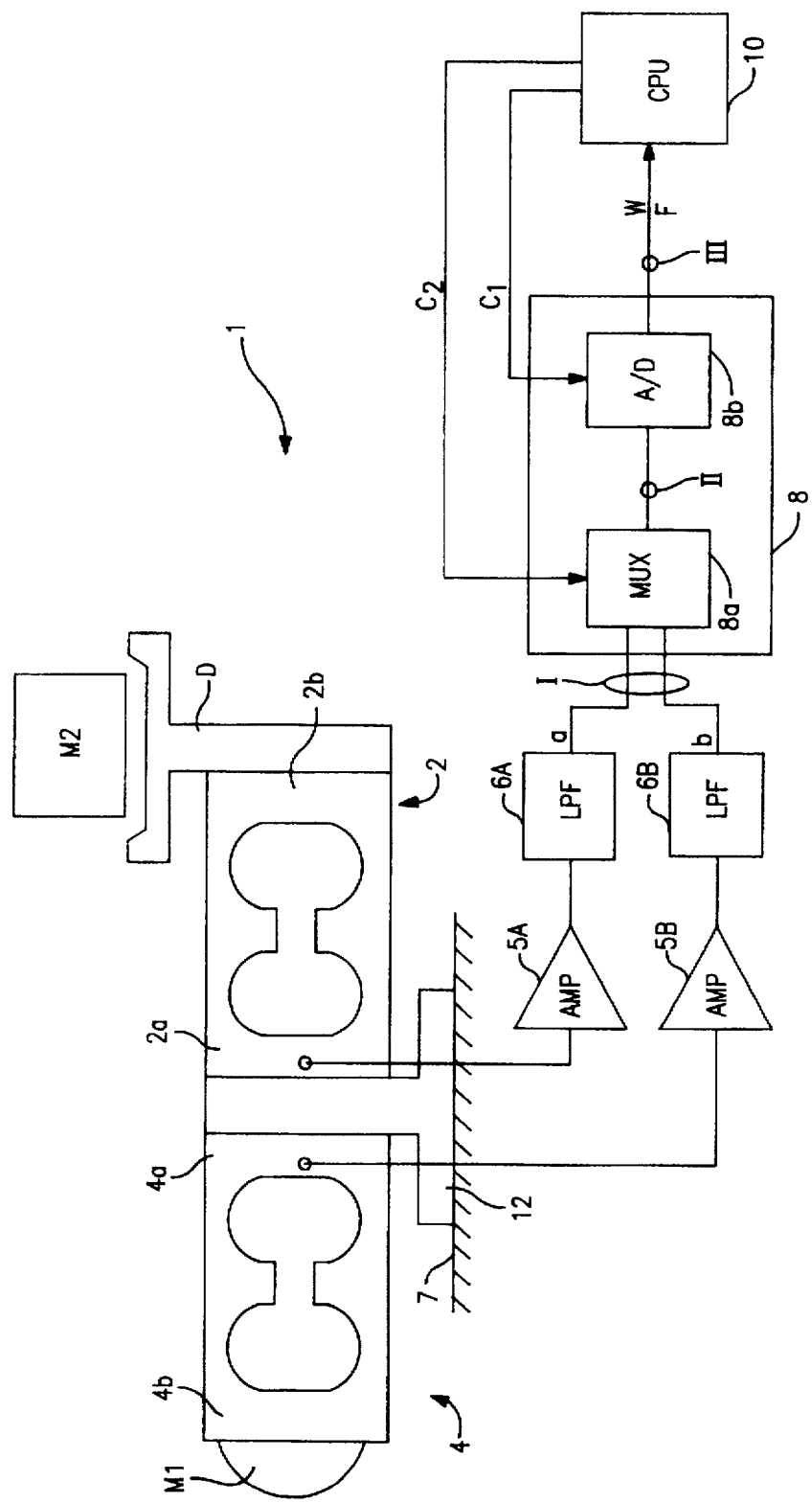
FIG. 1 is a schematic block diagram according to a first embodiment of the present invention.

Reference will now be made in detail to the present preferred embodiments of the present invention, examples of which are illustrated in the accompanying drawings, wherein like reference numerals refer to like elements throughout.

In FIG. 1, reference numeral 1 generally designates a weighing apparatus according to a first embodiment of this invention. The weighing apparatus 1 includes a weighing cell (load cell) 2 and a floor vibration detecting cell (load cell) 4. A fixed part 2a of the weighing cell 2 and a fixed part 4a of the floor vibration detecting cell 4 are supported at neighboring locations on a common frame 12 installed on the same floor 7. A weighing table D supports an article to be weighed M2 and is mounted on a movable part 2b of the weighing cell 2. A weight M1 applying a fixed load to the floor vibration detecting cell 4 is mounted on a movable part 4b of the floor vibration detecting cell 4. The weighing apparatus also includes amplifiers 5A,5B which amplify respectively a weighing signal and a floor vibration detection signal obtained from the weighing cell 2 and the floor vibration detecting cell 4, LPFs (low pass filters) 6A,6B sequentially connected to the output sides of the amplifiers 5A,5B, a digital converter 8 and a CPU 10.

Figure 2:
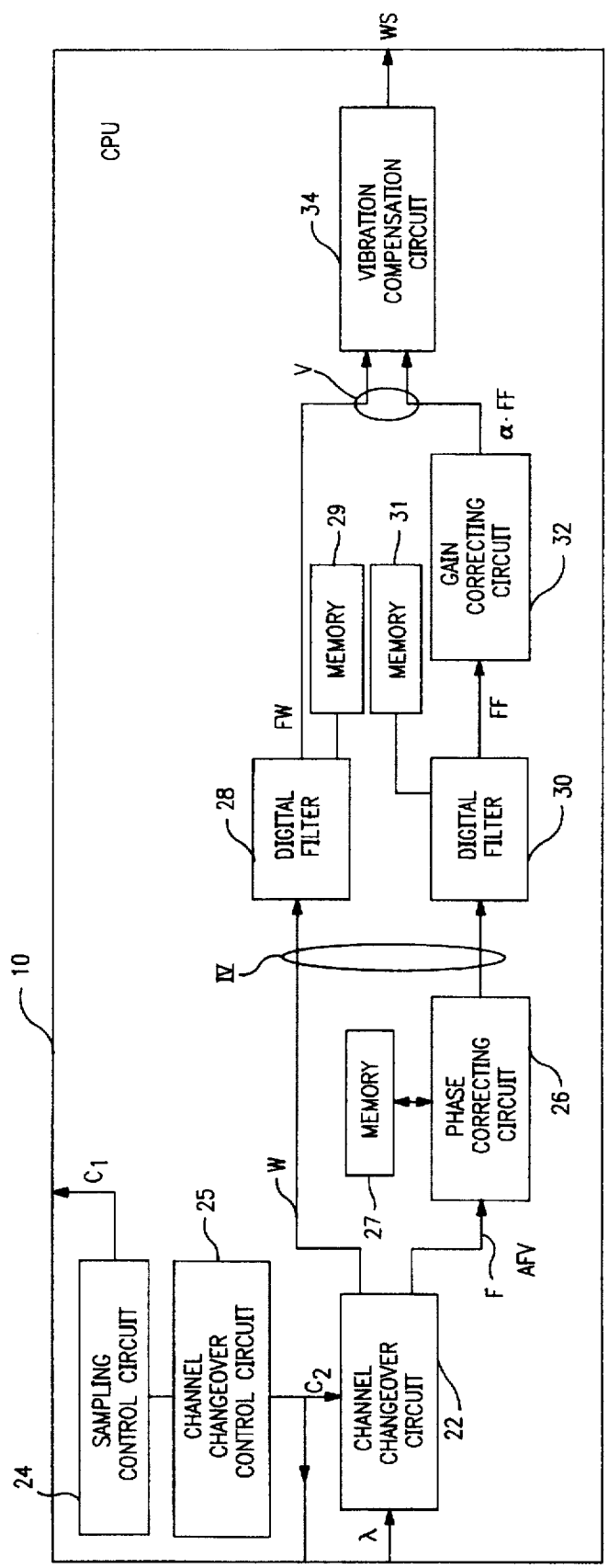
FIG. 2 is a schematic block diagram of the CPU shown in FIG. 1

The CPU 10, as shown in FIG. 2, includes a channel changeover circuit 22, sampling control circuit 24, channel changeover control circuit 25, phase correcting circuit 26 having a memory 27 (the circuit 26 operating in synchrony with the channel changeover control circuit 25), first digital filter 28 having a memory 29, second digital filter 30 having a memory 31, gain correcting circuit 32, and floor vibration compensating circuit 34.

The operation of this apparatus will be described below.

First, because the weighing cell 2 and the floor vibration detecting cell 4 are supported at neighboring locations on the frame 12, floor vibrations of substantially the same frequency and amplitude are applied to both of the cells 2,4. In this state, a weighing signal of an article to be weighed M2 is outputted from the weighing cell 2 and a floor vibration detection signal is outputted from the floor vibration detecting cell 4. These signals are amplified by the respective amplifiers 5A,5B, have frequencies above a fixed frequency removed by the low pass filters 6A,6B, and are inputted into the digital converter 8. The low pass filters 6A,6B are used to remove frequencies greater than twice the abovementioned sampling frequency of the digital converter 8. This prevents aliasing of the signal during sampling as will be understood by anyone skilled in the art.

Figure 3:
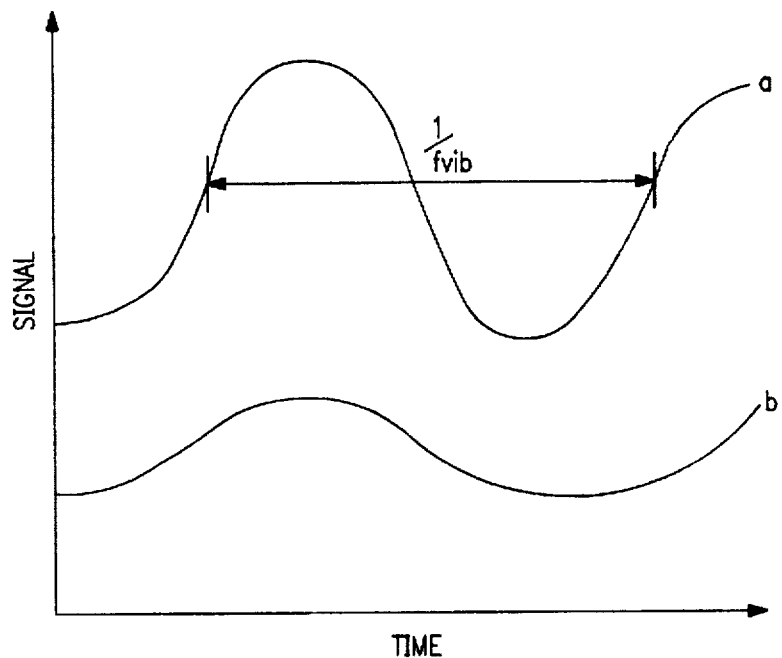
FIG. 3 illustrates graphically an example of the relative magnitudes of the signals input to the multiplexer at I in FIG. 1.

FIG. 3 shows graphically the relative magnitudes of the two signals entering the digital converter 8 at point I in FIG. 1. Even though the two cells 2,4 are subject to the same vibrations, the weighing signal a has a larger amplitude variation than the floor vibration detection signal b. This is a result of the weight of the article to be weighed M2 being greater than the weight of the weight M1, which causes the oscillations of the movable part 2b to be greater than the oscillations of the movable part 4b.

The digital converter 8 includes a two channel changeover device in the form of a multiplexer 8a which receives a sampling control signal C2, at a sampling frequency fs, from the channel changeover controlling circuit 25 of the CPU 10. The multiplexer 8a selectively samples the weighing signal and the floor vibration detection signal at the predetermined sampling frequency fs (for example 4 kHz).

Figure 4:
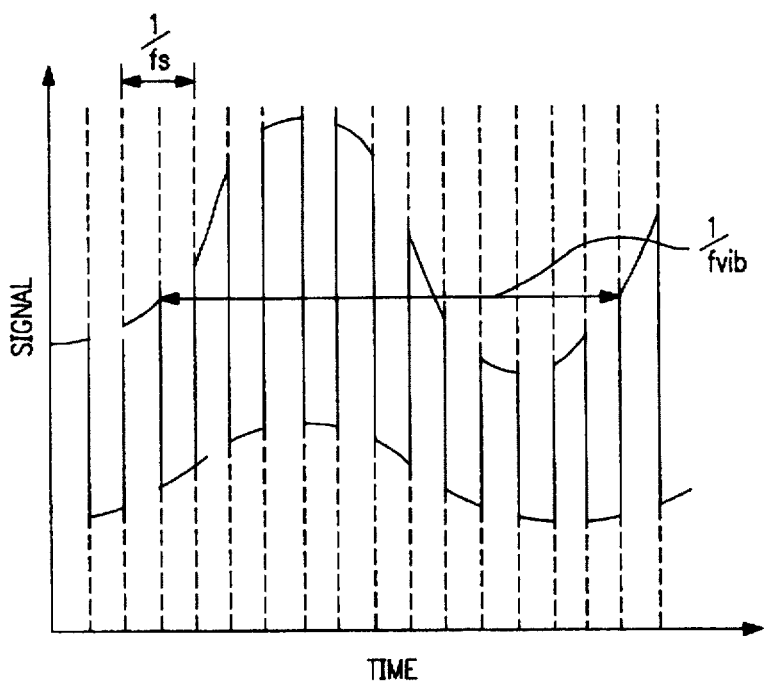
FIG. 4 illustrates graphically an example of the signal input to the A/D converter at II in FIG. 1.

The form of the signal output from the multiplexer 8a, at point II, is shown in FIG. 4. To ensure that information concerning the effect of the vibrations on the signals is not lost during sampling by the multiplexer 8a, it is important that the sampling frequency fs is much greater than the frequency of the vibrations fvib.

The sampled signals are then outputted to the A/D converter 8b which converts the signals into a digital weighing signal W or a digital floor vibration detection signal F respectively. These signals, with a mechanical vibration corresponding to the weight of the article to be weighed M2 superimposed, are then outputted to the CPU 10 as signal λ (see FIG. 2).

The sampling frequency of the A/D converter 8b is controlled by a sampling control signal C1 which the A/D converter receives from the sampling control circuit 24. In the preferred example of the invention, the signal C1 is of the same frequency as the signal C2, although the signals will be phase shifted relative to each other. This means that the multiplexer 8a and the A/D converter 8b sample incoming signals at the same frequency. As a result, the signal λ output by the A/D converter 8b to the CPU 10 at point III has the form shown in FIG. 5a. The weighing signal W has a number of values $a_0, a_1, a_2, a_3 \ldots$ which alternate with a number of values $b_0, b_1, b_2, \ldots$ of the floor vibration detection signal F.

In an alternative example of the invention, the signal C1 has a greater frequency than the signal C2 causing the A/D converter 8b to sample at a higher frequency than the multiplexer 8a. FIG. 5b shows an example of the resulting signal λ at point III if the A/D converter 8b samples at twice the rate of the multiplexer 8a. In this case, the weighing signal W has a number of pairs of values $a_0, a_1, a_2 \ldots$ which alternate with a number of pairs of values $b_0, b_1, b_2 \ldots$ of the floor vibration detection signal F.

Next, in the CPU 10, the channel changeover circuit 22 receives a channel changeover control signal C2 from the channel changeover controlling circuit 25 operating in synchrony with the sampling controlling circuit 24. This causes the channel changeover circuit 22 to change over the channel and input the digital weighing signal W into the first digital filter 28 on the weighing side and the digital floor vibration detection signal F into the phase correcting circuit 26 on the AFV side respectively. The digital weighing signal W of the weighing side is filtered by the first digital filter 28 to remove the mechanical vibration component and a filtered weighing signal FW is outputted. The digital floor vibration detection signal F of the AFV side is processed by the phase correcting circuit 26 to produce a phase corrected vibration signal F', which in turn is filtered by the second digital filter 30 to remove the mechanical vibration component and a filtered phase corrected floor vibration detection signal FF' is outputted.

During the digital conversion of the signals by the digital converter 8, a phase difference arises between the digital weighing signal W and the floor vibration detection signal F. The phase difference is caused by the gap in time of the sampling of the two signals. If it is assumed that the weighing signal is sampled before the floor vibration detection signal by a time $\Delta t$, then the phase difference $\Delta\Theta$ (rad) of the two signals at a given frequency f becomes:

$$\Delta\Theta = 2\pi f \Delta t \quad (1)$$

Figure 5A:
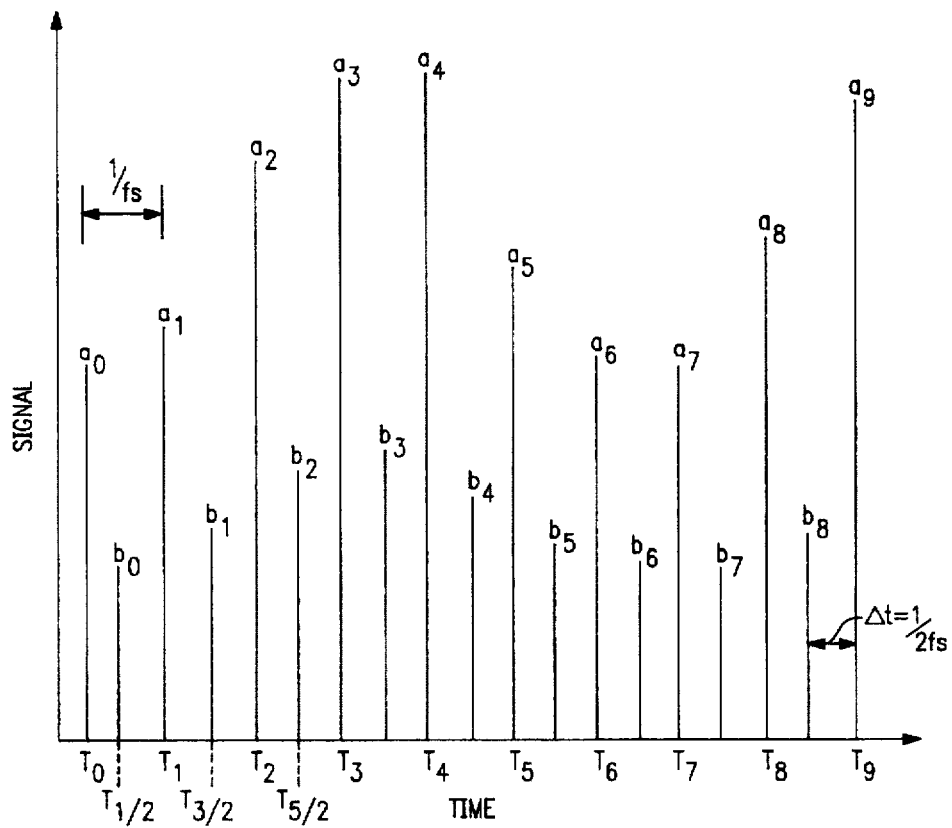
FIG. 5(a) is the preferred example of the digitized signal output from the digital converter at III in FIG. 1.
Figure 5B:
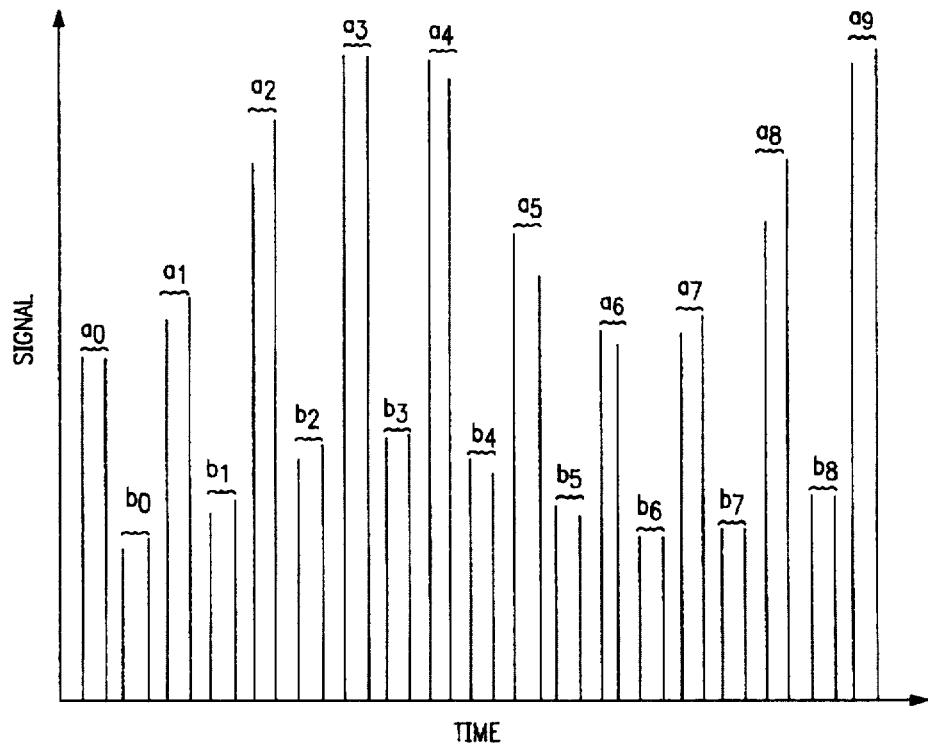
FIG. 5(b) is an alternative example of the digitized signal output from the digital converter at III in FIG. 1.

If it is assumed that, as in FIGS. 5a, the sampling timings of the weighing side and the AFV side are staggered by half of the sampling period T (1/fs) of each channel, then:

$$\Delta t = \frac{1}{2}fs \quad (2)$$

From Equation (1) the phase difference $\Delta\Theta$ becomes:

$$\Delta\Theta = \pi f/fs \quad (3)$$

In order to nullify this phase difference, the phase correcting circuit 26 is provided on the AFV side of the circuit, to apply a phase correction to the floor vibration detection signal F. Alternatively the phase correction circuit 26 may be provided on the weighing side, but in that case a phase gap or shift equivalent to the phase difference is applied to the digital weighing signal W.

In this example, the phase correcting circuit 26 is a linear phase FIR digital filter that carries out a simple-averaging on two floor vibration detection signal values $b_0$ and $b_1$, $b_1$ and $b_2$, $b_2$ and $b_3$ ... The phase characteristic $\Theta F$ of a linear phase FIR digital filter is given by the general equation:

$$\Theta F = -M\omega T/2$$

where (M+1) is made the simple average figure and $\omega(\omega = 2\pi f)$ the angular frequency.

Therefore, in the case of the simple-averaging filtering of the two values, because M=1

$$\Theta F = -\omega T/2 = -\pi f/fs \quad (4)$$

Comparison of equations (3) and (4) shows that this phase change counteracts the effect of the phase difference caused by the sampling in the digital converter 8. Thus, when simple-averaging processing is carried out on the two AFV side values $b_0$, and $b_1$, $b_1$ and $b_2$, $b_2$ and $b_3$, ... of the digital floor vibration detection signal F, a phase change occurs ensuring that the signal output by the phase correction circuit 26 has the same phase as the weighing side values $a_0$, $a_1$, $a_2$, $a_3$, ... of the digital weighing signal W. As a result, because the phase difference arising due to the sampling timing gap between the weighing signal and the floor vibration detection signal ceases to exist, it is possible to increase the accuracy of the floor vibration compensation (AFV) when subtracting the floor vibration detection signal from the weighing signal.

Figure 6:
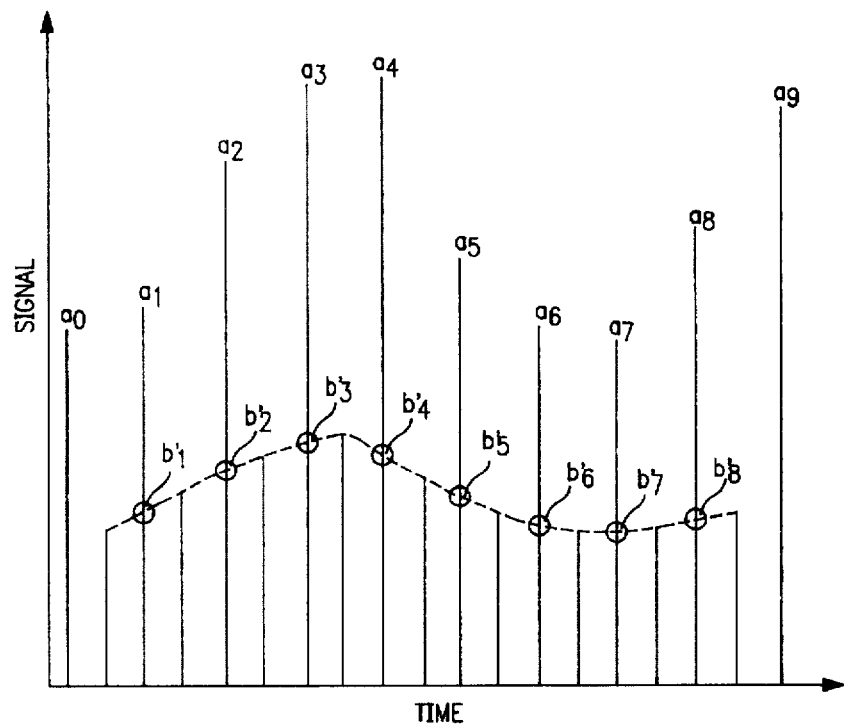
FIG. 6 shows how the phase correction is achieved.
Figure 7:
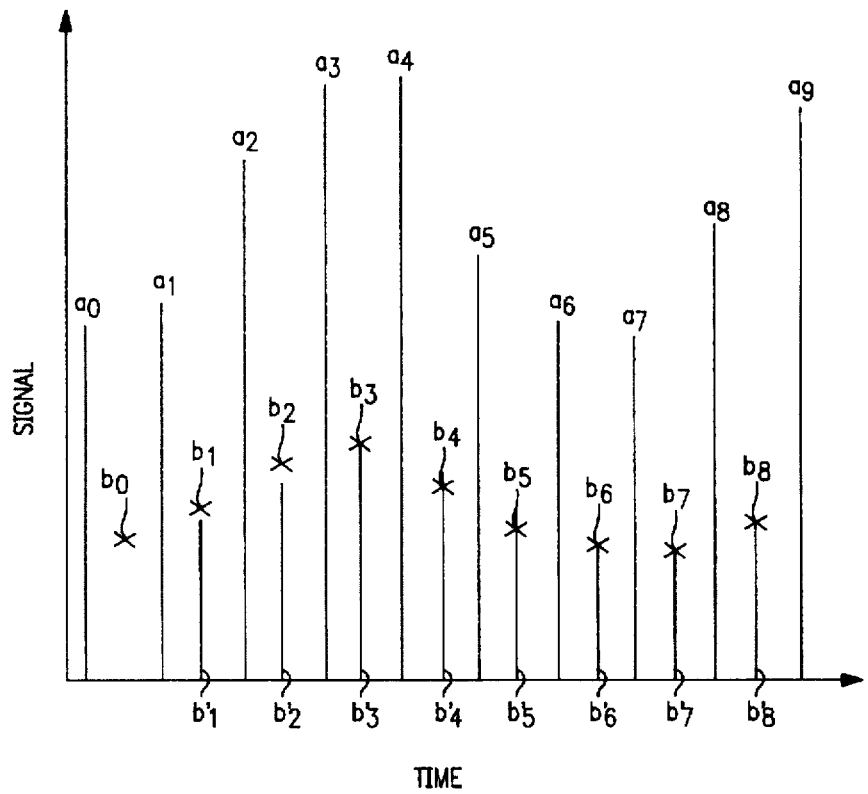
FIG. 7 shows the phase corrected signals prior to digital filtering at IV in FIG. 2.

FIG. 6 shows how the averaging of the floor vibration detection signal corrects the phase difference between the two signals. To achieve this, the phase correcting circuit 26 stores the two most recent values of the floor vibration detection signal F in the memory 27 and then averages these to obtain a resultant phase shifted value which is fed to the filter 30. The phase shifted floor vibration detection signal F' has values $b_1'$, $b_2'$, $b_3'$ ... whose values are given by $\frac{1}{2}(b_0+b_1)$, $\frac{1}{2}(b_1+b_2)$, $\frac{1}{2}(b_2+b_3)$ ... respectively It is important to realize that while this method corrects the phase difference, there is still a difference in the timing of the data. This is highlighted by FIG. 7 which shows the signal prior to input to the digital filters 28, 30 at point IV. The timing difference arises as a result of it being impossible to calculate the average of $b_0$ and $b_1$ ($b_1'$) in the phase correction circuit 26 until the value $b_1$ has been input to the phase correction circuit 26. By this time the value $a_1$ has already been inputted into the digital filter 28. To overcome this problem, the value $a_1$ is stored in the memory 29 of the digital filter 28 until the filtered signal FF' with a value corresponding to $b_1'$ is ready to be output from the digital filter 30.

The digital filters 28,30 operate in a conventional manner in conjunction with the memories 29,31. Thus, in the case of the filter 28, each incoming digital value $a_0$, $a_1$, $a_2$, ... of the weighing signal W is stored in the memory 29 to construct a data row of the n most recent values. The filter 28 then outputs a value $\bar{a}_0$, $\bar{a}_1$, $\bar{a}_2$, ... representing the average of the n values currently stored in the memory 29, to make up the filtered weighing signal FW. The filter 30 operates in a similar manner in conjunction with the memory 31 to generate the values $\bar{b}_0'$, $\bar{b}_1'$, $\bar{b}_2'$, ... of the floor vibration detection signal FF'.

Figure 9:
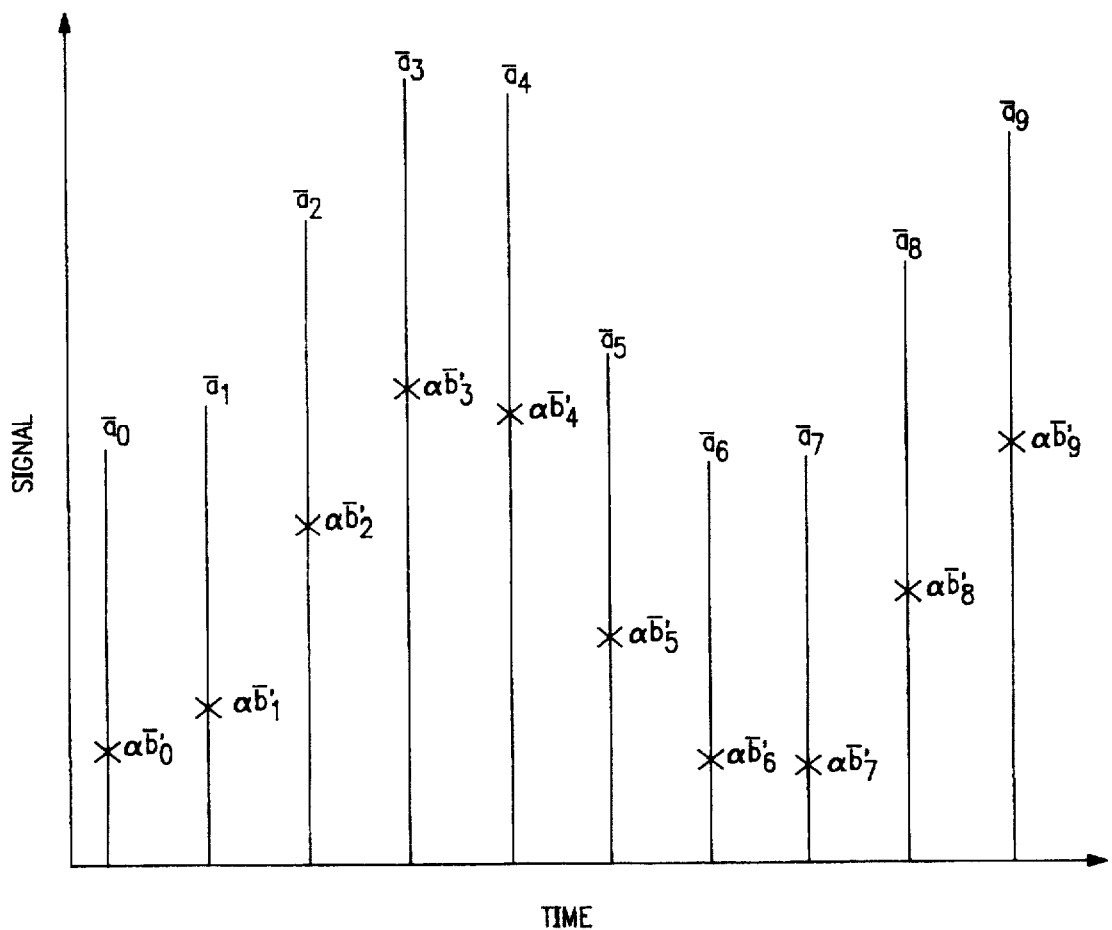
FIG. 9 shows the gain corrected signals input into the vibration compensator of FIG. 2.

Next, because the output sensitivities of the weighing cell 2 and the floor vibration detecting cell 4 are different, adjustment of the gain $\alpha$ of the digital floor vibration detection signal FF is carried out by the gain correcting circuit 32 to correct for this. As a result, a gain corrected signal $\alpha$FF' with values $\alpha\bar{b}_1'$, $\alpha\bar{b}_2'$, $\alpha\bar{b}_3'$, ... is output from the gain correcting circuit 32 at point V, as shown in FIG. 9. Alternatively, the gain correcting circuit 32 may be provided on the weighing side and gain adjustment of the digital weighing signal FW carried out.

Then, subtraction processing is carried out on the filtered signal FW of the weighing cell 2 and the gain-adjusted weighing signal $\alpha$FF' of the floor vibration detecting cell 4 by the compensating circuit 34, and a floor vibration corrected signal WS corrected for floor vibration, which is vertical direction displacement of the position in which the weighing cell 2 is disposed, is outputted on the basis of the operation FW−$\alpha$FF'=WS. As a result, a floor vibration corrected weighing signal WS wherein error of the weighing signal originating in floor vibration has been accurately compensated for is obtained.

Figure 8:
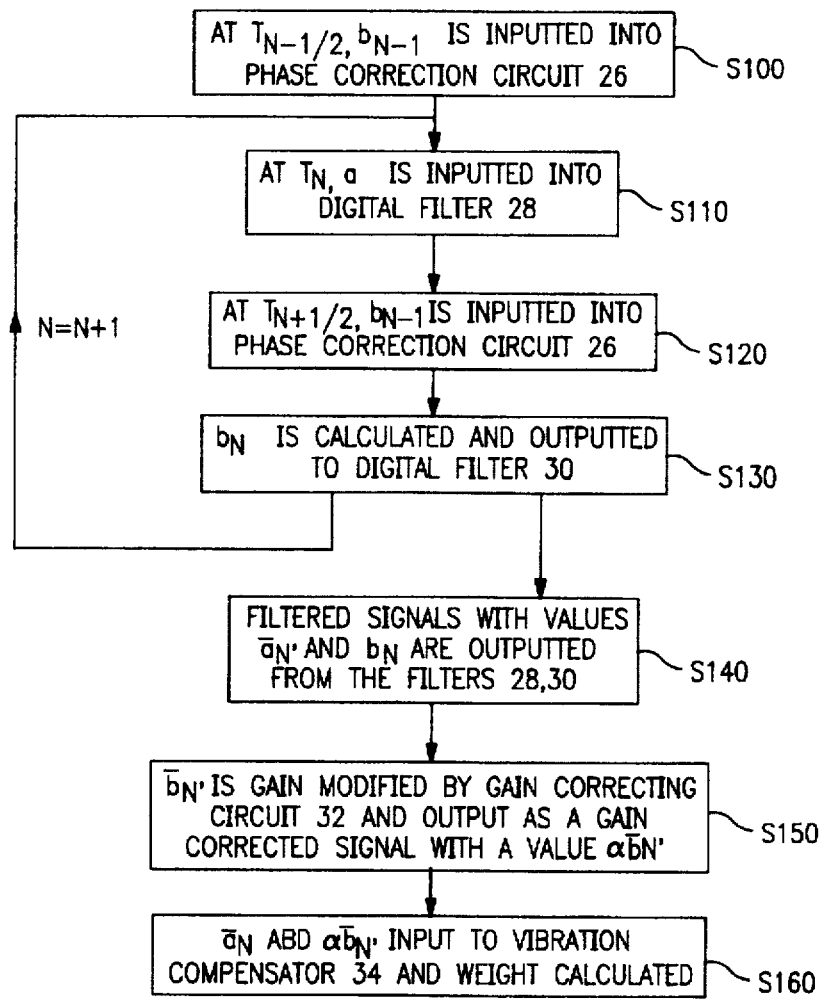
FIG. 8 is a flow diagram showing the order in which the phase correction and filtering processes occur.

The actual timing of the phase correction and filtering processes is shown in FIG. 8. Initially, a value $b_{N-1}$ is input into the phase correction circuit 26, at step S100. Shortly after this, the value $a_N$ of the weighing signal W is input into the digital filter 28 and stored in memory 29, at step S110. The value $b_N$ is then input into the phase correction circuit 26, at step S120, and the phase corrected signal F' with a value $b_N'$ is output to the digital filter 30, at step S130. At this point, the phase correction process repeats itself with an increased value of N.

Simultaneously, the digital filters 28,30 filter the respective incoming signals W and F' at step S140. In the case of the weighing signal W, this involves averaging the value $a_N$ with the previous n values ($a_{N-n}$, $a_{N-n+1}$, ... $a_{N-1}$) to produce the filtered weighing signal FW with a value $\bar{a}_N$. A similar process is repeated in filter 30 to produce the phase corrected filtered floor vibration signal FF' with a value corresponding to $\bar{b}_N'$.

At step S150, the signal FF' undergoes gain correction to produce a signal $\alpha$FF' with a value $\alpha \bar{b}_N'$. The values corresponding to $\alpha \bar{b}_N'$ and $\bar{a}_N$ are then input into the vibration compensator and the signal representing the weight is calculated, at step S160. It will be understood that the components of the CPU 10 are controlled in synchrony, but for clarity the control lines have been omitted.

Although the CPU 10 has been shown in FIG. 2 in a hardware form, all or part of the functions performed by the components shown in FIG. 2 could be implemented in software.

Figure 10:
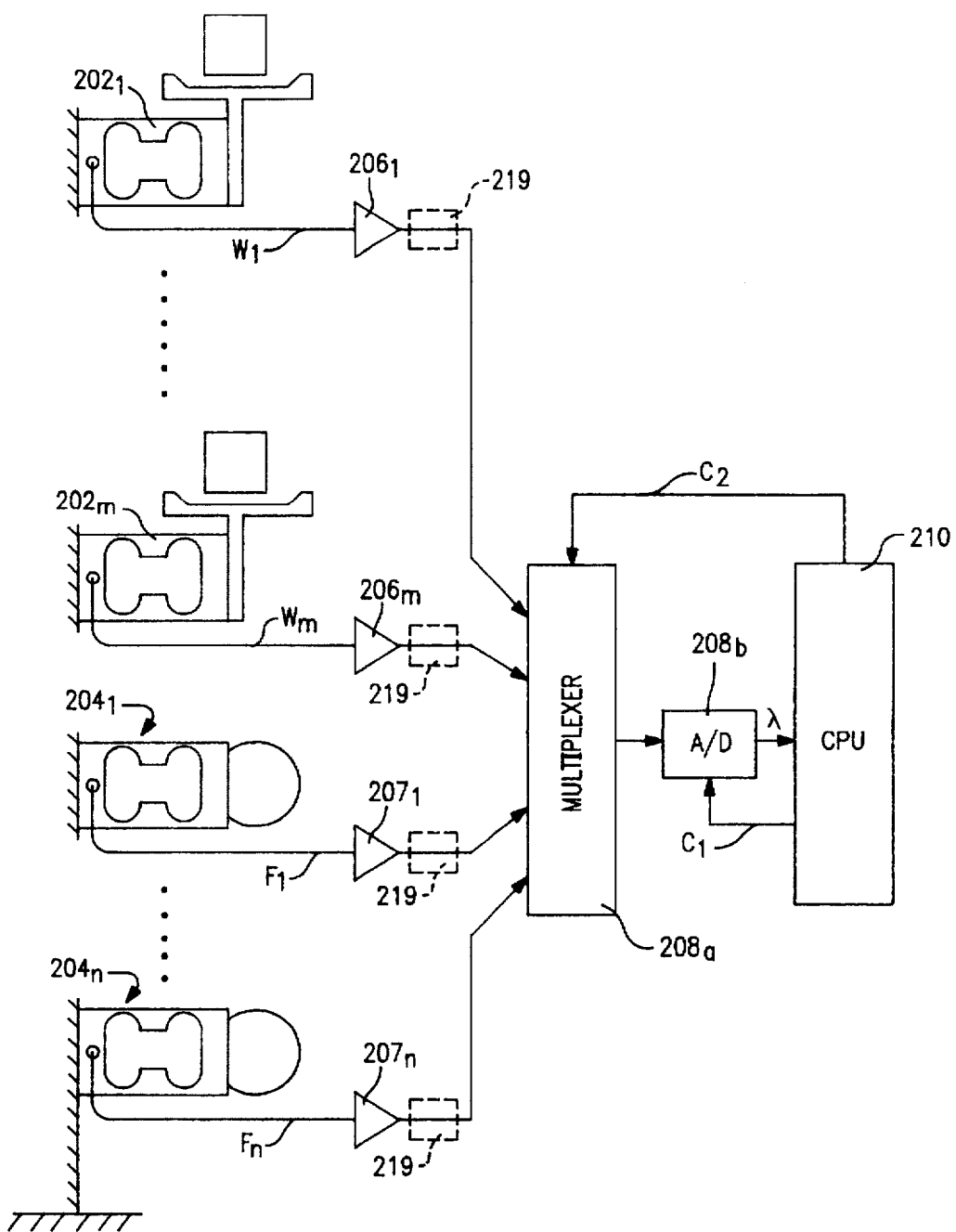
FIG. 10 is a schematic block diagram according to a second embodiment of the present invention.

FIG. 10 illustrates a second embodiment of the present invention including a plurality of weighing cells $202_1$, ... $202_m$ and a plurality of floor vibration detection cells $204_1$, ... $204_n$. In such a situation, the cells will be connected via amplifiers $206_1$, ... $206_m$, $207_1$ ... $207_n$, and LPFs (low pass filters) 219 to a multi channel change-over device in the form of a multiplexer $208_a$ and an A/D converter $208_b$, as shown in FIG. 10. Thus, the floor vibration detection signals $F_1$, ... $F_n$ obtained from the floor vibration detection cells $204_1$, ... $204_n$ and the weighing signals $W_1$, ... $W_m$ obtained from the weighing cells $202_1$, ... $202_m$ will be amplified, low pass filtered and then input into the multiplexer $208_a$, in a manner similar to that described above for the first embodiment of the invention. The multiplexer $208_a$ and the A/D converter $208_b$ sample the signals to produce a single digital output signal $\lambda$ including information from all the weighing and floor vibration detection cells. The signal $\lambda$ shown in FIG. 12 is then input into the CPU 210.

Figure 11:
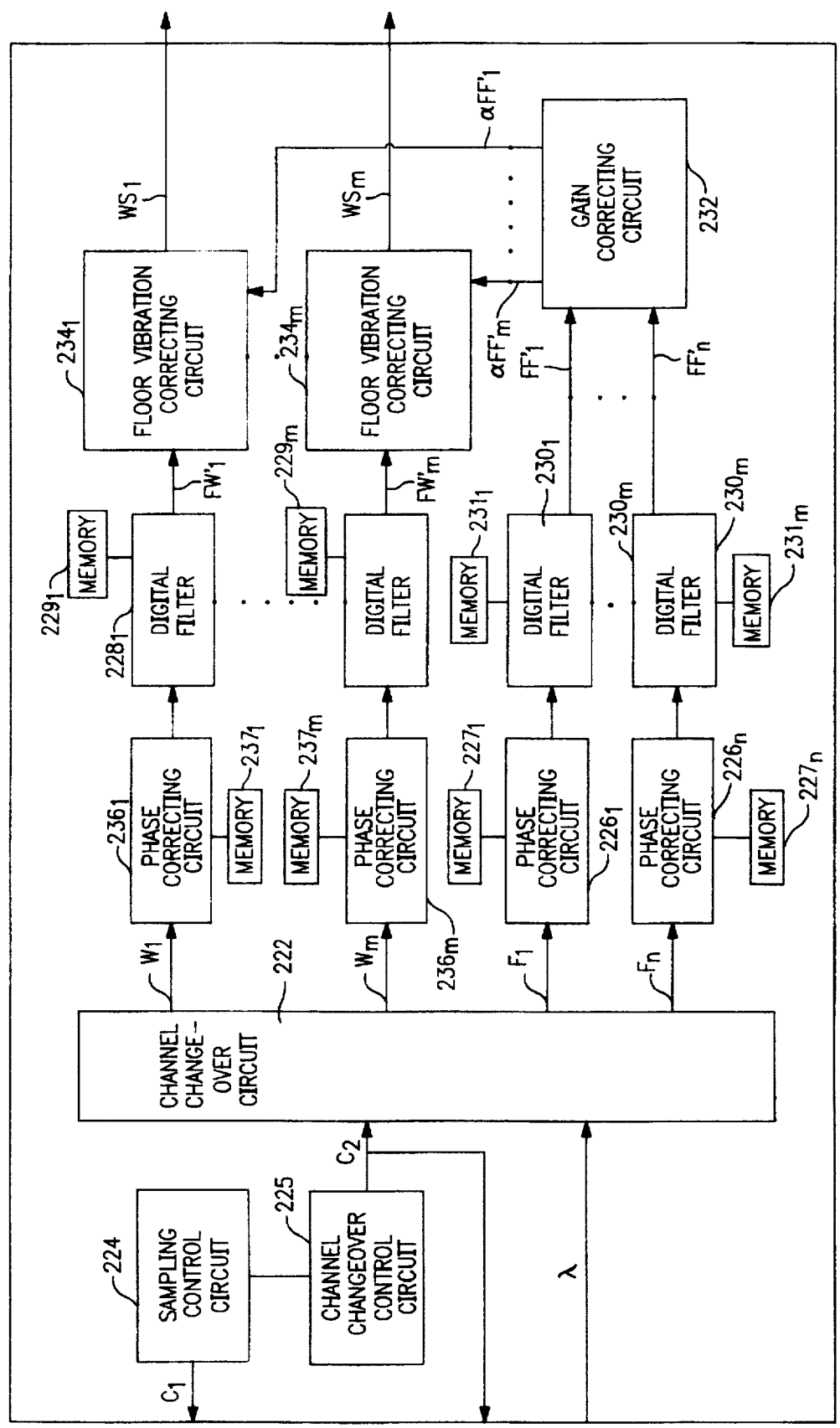
FIG. 11 is a schematic block diagram of the CPU shown in FIG. 10.

One possible design of the CPU 210 is shown in FIG. 11. This follows the design of the CPU 10 of FIG. 2 in that it includes a channel changeover circuit 222, sampling control circuit 224 and channel changeover control circuit 225, which operate in a similar manner to the equivalent components of the first embodiment. In contrast to the first embodiment, however, there is provided a plurality of weighing sides, each one for processing one weighing signal $W_1$, ... $W_m$ from a weighing cell $202_1$, ... $202_m$ and a plurality of AFV sides, each one for processing a floor vibration detection signal $F_1$, ... $F_n$ from a floor vibration detection cell $204_1$, ... $204_n$.

In operation, as in the first embodiment, it will be necessary to apply a phase correction to each of the signals in order to correct for the phase difference that arises due to the difference in sample timing. This may be achieved by applying a phase correction to each floor vibration detection signal to produce a phase corrected floor vibration detection signal $F_1'$, ... $F_n'$ which has a phase equal to the phase of the corresponding weighing signal $W_1$ ... $W_m$. The signals are also filtered to produce filtered floor vibration detection signals $FF_1'$, ... $FF_n'$ and filtered weighing signals $FW_1$, ... $FW_m$ and then gain correction would be performed to obtain gain corrected floor vibration detection signals $\alpha FF_1'$, ... $\alpha FF_n'$. Assuming that there are an equal number of weighing cells and floor vibration detection cells (i.e. n=m), then the relevant signals can be subtracted from each other, as in the first embodiment, to achieve a number of corrected weighing signals $WS_1$, ... $WS_m$ (i.e. $FW_1 - \alpha FF_1' = WS_1$). However, it is preferable to apply a phase correction to all the signals thus bringing all the weighing and floor vibration detection signals in phase. This is again achieved using FIR digital filtering.

Figure 12:
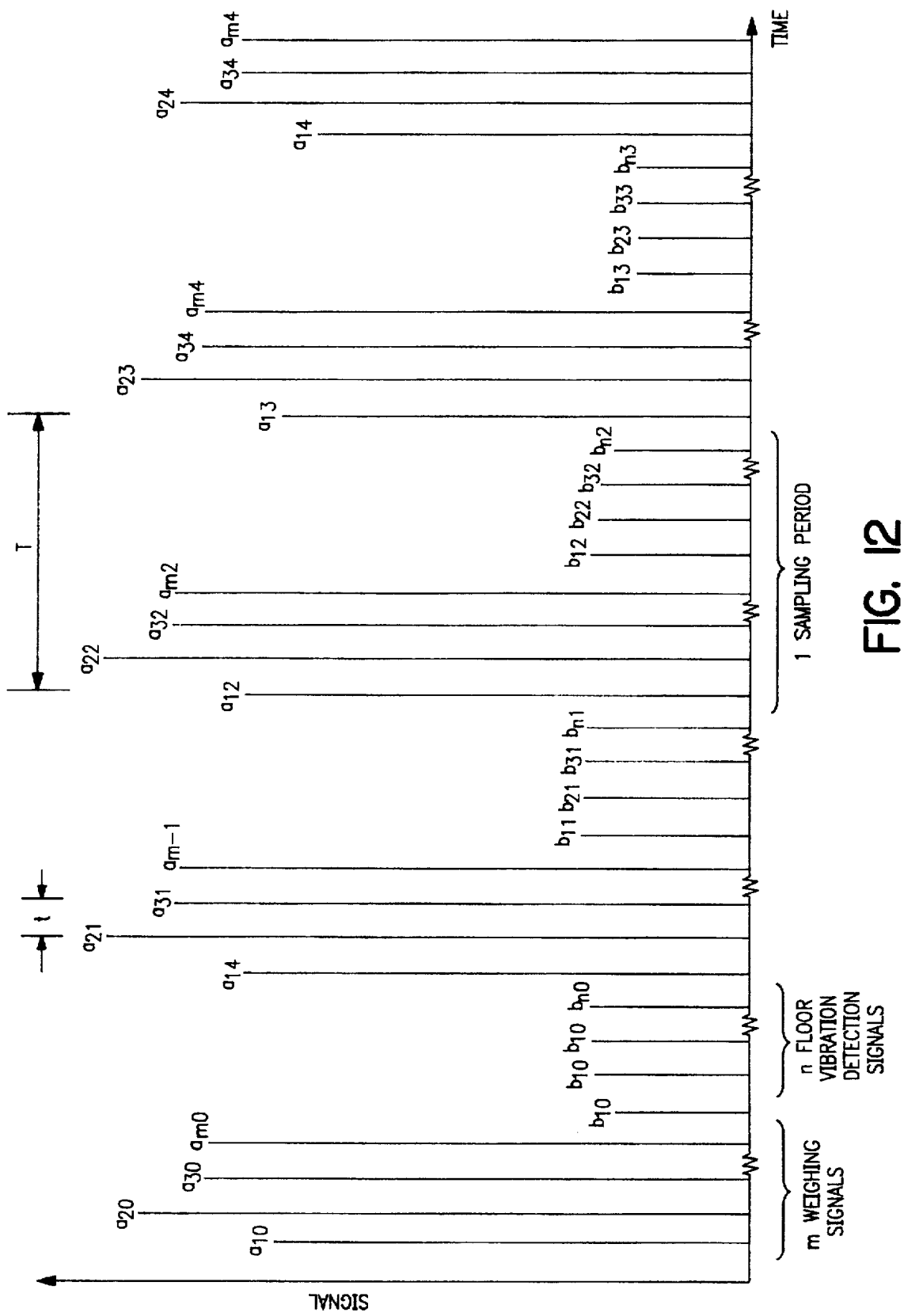
FIG. 12 shows the signal λ output from the A/D converter to the CPU in the second embodiment of the present invention.

In order to apply the phase correction, it is necessary to take into account the form of the signal $\lambda$ output from the A/D converter $208_b$, which is shown in FIG. 12. The figure shows m weighing signals with values $a_{10}$, ... $a_{mo}$ and n floor vibration detection signals with values $b_{10}$, ... $b_{no}$ combined from N different channels (i.e. n+m=N) per sampling period T. The sampling then repeats for subsequent periods as shown. Preferably, each channel is sampled as frequently as in the first embodiment such that T=½fs, in which case t=½Nfs. However, if a large number of channels are used, the sampling frequency fs may have to be decreased. The general formula for an FIR digital filter operating in this mode, as will be understood by a person skilled in the art, is given by:

$$X_{s,r} = \{(s-1)\cdot t/T\} * W_{s(r-1)} + \{(T-(s-1)\cdot t)/T\} * W_{s,r} \qquad (5)$$

where:

T=sampling period t=sampling interval between channels s=sampled channel r=number of data points sampled Thus, for each channel, the phase correction applied is given by the set of equations:

$$X_{1r} = W_{1r} \qquad (6)$$
$$X_{2r} = t/T \cdot W_{2(r-1)} + (T-t)/T \cdot W_{2r}$$
$$X_{3r} = 2t/T \cdot W_{3(r-1)} + (T-2t)/T \cdot W_{3r}$$
$$\vdots$$
$$X_{Nr} = \{(N-1)\cdot t/T\} * W_{N(r-1)} + \{(T-(N-1)\cdot t)/T\} * W_{Nr}$$

If, as in the first embodiment, the phase correction is achieved by using an average of two signals from the same channel then the equations become:

$$X_{12} = W_{12} \qquad (7)$$
$$X_{N2} = [(N-1)\cdot t/T] \times W_{N1} + [(T-(N-1)\cdot t)/T] \times W_{N2}$$

It should be realized that the coefficients of filtering are no longer symmetric. This means that the two signals from a single channel are no longer averaged about their mid-point as in the first embodiment. As a result, the simple averaging of the first embodiment is replaced by a weighted average. This situation corresponds to the case when the phase difference between the signals in the first embodiment is no longer:

$$\Delta t = \frac{1}{2} f s.$$

Thus, the phase characteristic for the filtering is no longer linear. Although this means, in theory, that the phase differences cannot be corrected over all frequencies, it is still effective when the sampling frequency $f_s$ is much greater than the vibration frequency $f_{vib}$. Thus, in this case, where the high frequency signals are fully attenuated, the frequencies of the floor vibrations are comparatively low and therefore the non-linearity is of no problem in practical use.

After undergoing phase correction by phase correcting circuits $236_1$, ... $236_m$ and $226_1$, ... $226_n$ (and corresponding memories $237_1$, ... $237_m$ and $227_1$, ... $227_n$), the phase corrected signals are output to the digital filters $228_1, \ldots 228_m, 230_1, \ldots 230_n$. As in the first embodiment, the phase corrected signals $W_1', \ldots W_m', F_1', \ldots F_n'$ will still have a timing difference, due to the timing of the arrival of the various signals at the phase correcting circuits. Again, this is overcome by holding the signals in the memory $229_1, \ldots 229_m, 231_1, \ldots 231_n$ of the digital filters, until the correct timing is achieved. The signals are then output to the vibration compensating circuits $234_1, \ldots 234_m$, with the floor vibration detection signals first undergoing gain correction in a gain correction circuit 232. In the case where there are an equal number of weighing and floor vibration detection cells (n=m), then the gain corrected filtered floor vibration detection signals $\alpha FF_1', \ldots \alpha FF_m'$ are subtracted from the corresponding weighing signal $FW_1', \ldots FW_n'$ to produce a corrected weighing signal $WS_1, \ldots WS_m$.

It will be realized by a person skilled in the art that this method could be applied to a system in which there are a plurality of weighing cells and only a single floor vibration detection cell. In this case, it is important that after the phase correction and the filtering, all signals have the same phase and the same timing. Then, subsequent to the gain correction, the floor vibration detection signal could be removed from each weighing signal to produce a plurality of corrected weighing signals. Alternatively, any number of floor vibration detection cells could be used, with each floor vibration detection signal being subtracted from as many weighing signals as required.

Figure 13:
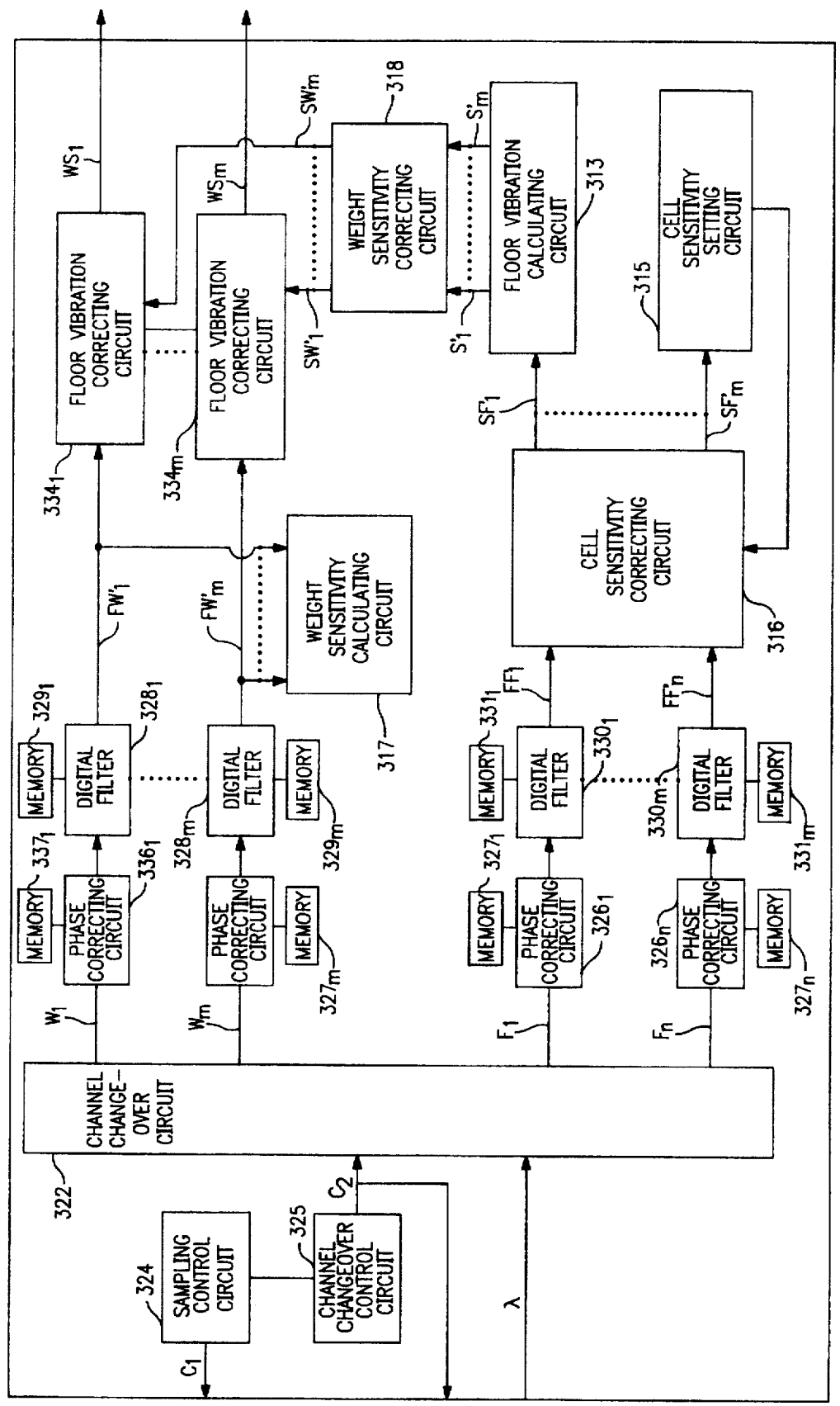
FIG. 13 is a schematic block diagram of an alternative CPU according to a third embodiment of the present invention.

There is also provided a third embodiment of the present invention which uses the plurality of weighing cells $202_1, \ldots 202_m$ and floor vibration detection cells $204_1, \ldots 204_n$ shown in FIG. 10. The only difference is the provision of an alternative CPU 310 to replace the CPU 210 of the second embodiment. FIG. 13 shows the structure of the alternative CPU 310 which may be substituted for the CPU 210 shown in FIG. 11, being different therefrom in the following two aspects.

Firstly, this CPU 310 additionally includes a cell sensitivity setting circuit 315 and a cell sensitivity correcting circuit 316. The cell sensitivity setting circuit 315 serves to preliminarily set a cell sensitivity ratio between the weighing cells $202_1, \ldots 202_m$ and the floor vibration detection cells $204_1, \ldots 204_n$ on the basis of the loads on the floor vibration detection cells $204_1, \ldots 204_n$, the loads on the weighing cells $202_1, \ldots 202_m$ and the spring constant of the cells. The cell sensitivity correcting circuit 316 is for using the cell sensitivity ratio set by the cell sensitivity setting circuit 315 to thereby correct the floor vibration detection signals $F_1, \ldots F_n$ generating cell sensitivity corrected signals $SF_1, \ldots SF_n$. Secondly, there are further provided a weight sensitivity calculating circuit 317 and a weight sensitivity correcting circuit 318, which are for correcting the changes in sensitivity to the floor vibrations due to changes in the applied load. The weight sensitivity calculating circuit 317 serves to calculate the weight sensitivity ratio between the weighing and the floor vibration detection cells as it changes according to the weights of the objects $M_1, \ldots M_m$ being weighed. The weight sensitivity correcting circuit 318 serves to use the weight sensitivity ratio calculated by the weight sensitivity calculating circuit 317 to correct the displacement signals $S_1$-$S_m$ outputted from the floor vibration calculating circuit 313 and to thereby generate weight sensitivity corrected signals $SW_1, \ldots SW_m$.

It is important to realize that in order to achieve optimum results, it is preferable for all the signals input into the digital filters $328_1, \ldots 328_m, 330_1, \ldots 330_n$ to be of the same phase. It is therefore necessary for the weighing signals $W_1, \ldots W_m$ and the floor vibration detection signals $F_1, \ldots F_n$ to undergo the phase correction described by the equations (5), (6), (7) to generate phase corrected weighing signals $W_1', \ldots W_m'$ and phase corrected floor vibration detection signals $F_1', \ldots F_n'$. These signals are then subsequently filtered, to correct the relative timing of the signals, to produce filtered phase corrected weighing signals $FW_1', \ldots FW_m'$ and phase corrected floor vibration detection signals $FF_1', \ldots FF_n'$.

With reference still to FIG. 13, wherein components which are substantially identical to those shown in and explained with reference to FIG. 11 are indicated by numerals increased by 100, cell sensitivity corrections are performed by the cell sensitivity correcting circuit 316, and the floor vibration detection signals $F_1, \ldots F_n$ are converted to the levels of the weight signals $W_1, \ldots W_m$ by the cell sensitivity setting circuit 315. These converted signals (cell sensitivity corrected signals $SF_1', \ldots SF_n'$) are used by the floor vibration calculating circuit 313 to calculate the floor vibrations. Further, the weight sensitivity correcting circuit 318 carries out sensitivity corrections according to the weights of the objects applied to the weighing cells $202_1, \ldots 202_m$, thereby outputting weight sensitivity corrected signals $SW_1, \ldots SW_m$, which are used by the floor vibration correcting circuit $334_1, \ldots 334_n$ to subtract the vibration components of the floor represented by the weight sensitivity corrected signals $SW_1, \ldots SW_m$ from the weight signals $W_1, \ldots W_m$, thereby obtaining vibration corrected weight signals $WS_1, \ldots WS_m$.

Figure 14:
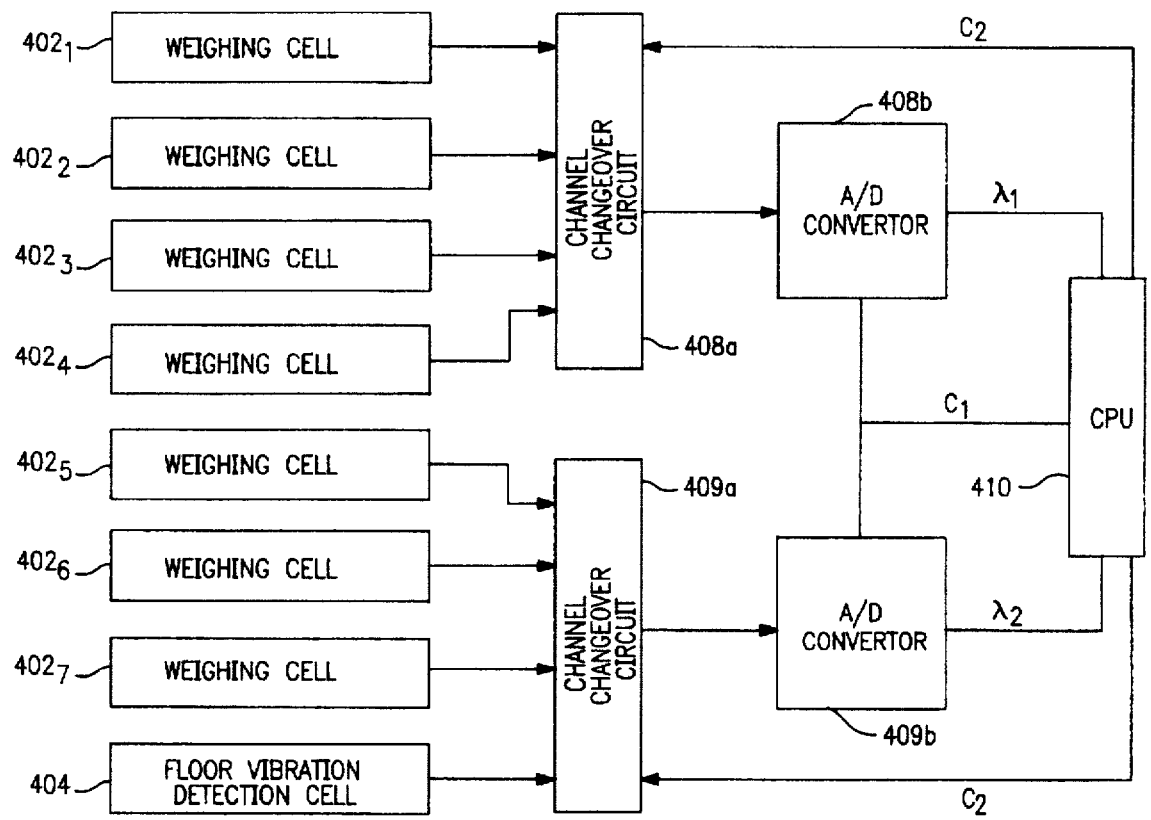
FIG. 14 is a schematic block diagram of apparatus according to a fourth embodiment of the present invention.

A fourth embodiment of the present invention is shown in FIG. 14. This includes a plurality of weighing cells $402_1, \ldots 402_7$, and a floor vibration detection cell 404. These cells are connected via amplifiers and low pass filters (not shown) to a channel change-over circuit including two multiplexers 408a, 409a. The multiplexers are in turn connected to two A/D converters 408b, 409b to produce two output signals $\lambda_1, \lambda_2$ which are fed into the CPU 410.

Figure 15:
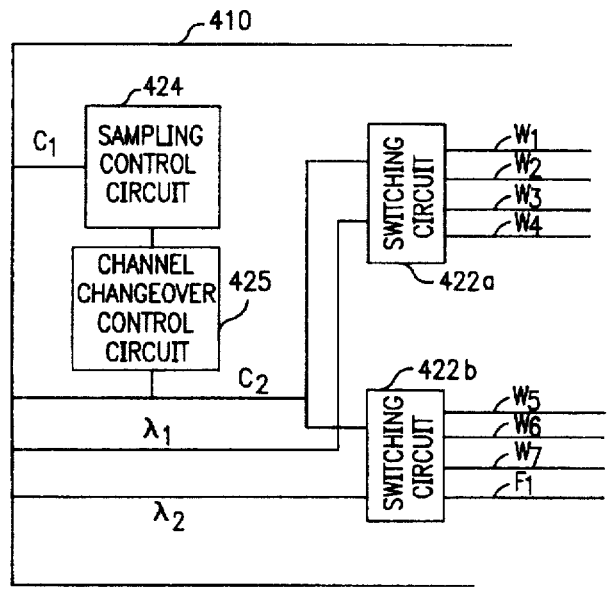
FIG. 15 is a diagram showing the changeover circuit of the fourth embodiment of the present invention.

The CPU 410 can be of the form shown in FIG. 11 or FIG. 13, the only adaptation that is required would be for the provision of two switching circuits 422a, 422b to output signals $W_1, W_2, W_3, W_4, W_5, W_6, W_7, F_1$ obtained from signals $\lambda_1, \lambda_2$ to the appropriate weighing signal and floor vibration signal sides. A possible arrangement of the switching circuits is shown in FIG. 15 which also shows the required channel changeover controlling circuit 425 operating in synchrony with the sampling control circuit 424 in a manner similar to that used in the first example.

As will be understood by a person skilled in the art, the higher the rate at which the signals from the weighing and floor vibration detection cells can be sampled, the better the floor vibration compensation will be. There is a finite rate at which it is possible to sample the signals from the cells. Therefore, in the case where a large number of cells are used, it is preferable to increase the number of A/D converters used. Increasing the number of converters from one to two allows the sampling frequency to be increased two-fold while the actual sampling rate of each A/D converter remains constant.

A person skilled in the art will realize that although the example in FIG. 14 shows seven weighing cells $402_1, \ldots 402_7$ and a single floor vibration detection cell, any number of either type of cell could be used in conjunction with any number of A/D converters to achieve the required sampling rate.

Although preferred embodiments have been shown and described, it would be appreciated by those skilled in the art that changes may be made in these embodiments without departing from the principles and spirit of the invention, the scope of which is defined in the claims and their equivalents.

What is claimed is:

1. A weighing apparatus comprising:
   a weighing cell to weigh an article and to output a weighing signal;
   a floor vibration detecting cell to detect a vibration of a floor supporting said weighing cell and to output a floor vibration signal;
   a sampling circuit to selectively sample said weighing signal and said floor vibration signal at a predetermined sampling frequency and to output a corresponding sampling weighing signal and sampling floor vibration signal, said sampling floor vibration signal having a phase difference from said sampling weighing signal due to a difference in times at which said weighing signal and said floor vibration signal are sampled; and
   a phase correcting circuit to apply a phase correction to said sampling floor vibration signal to remove said phase difference and to output a corrected sampling floor vibration signal.

2. The weighing apparatus according to claim 1, further comprising:
   an A/D converter to convert said sampling weighing signal into a digital weighing signal and to convert said sampling floor vibration signal into a digital floor vibration signal, wherein said phase correcting circuit applies said phase correction to said digital floor vibration signal and outputs a corrected digital floor vibration signal such that a phase of said corrected digital floor vibration signal equals a phase of said digital weighing signal.

3. The weighing apparatus according to claim 2, further comprising:
   a first digital filter to filter said digital weighing signal;
   a second digital filter to filter said corrected digital floor vibration signal; and
   a vibration compensating circuit to subtract said filtered corrected digital floor vibration signal from said filtered digital weighing signal and to output a floor vibration compensated signal.

4. The weighing apparatus according to claim 3, further comprising:
   a gain correction circuit to adjust a gain of said filtered corrected digital floor vibration signal, wherein said vibration compensating circuit subtracts said gain adjusted filtered corrected digital floor vibration signal from said filtered digital weighing signal and outputs said floor vibration compensated signal.

5. The weighing apparatus according to claim 2, wherein said phase correcting circuit determines said phase correction by simple-averaging values of said digital floor vibration signal.

6. The weighing apparatus according to claim 2, further including a plurality of weighing cells and a plurality of floor vibration detecting cells, wherein said phase correcting circuit determines said phase correction by weighted-averaging values of said digital floor vibration signal.

7. A weighing apparatus comprising:
   a weighing cell to weigh an article and to output a weighing signal;
   a floor vibration detecting cell to detect a vibration of a floor supporting said weighing cell and to output a floor vibration signal;
   a sampling circuit to selectively sample said weighing signal and said floor vibration signal at a predetermined sampling frequency and to output a corresponding sampling weighing signal and sampling floor vibration signal, said sampling weighing signal having a phase difference from said sampling floor vibration signal due to a difference in times at which said weighing signal and said floor vibration signal are sampled; and
   a phase correcting circuit to apply a phase correction to said sampling weighing signal to remove said phase difference and to output a corrected sampling weighing signal.

8. A weighing apparatus comprising:
   a weighing cell to weigh an article and to output a weighing signal;
   a floor vibration detecting cell to detect a vibration of a floor on which said weighing cell is installed and to output a floor vibration detection signal;
   a sampling circuit to alternately sample said weighing signal and said floor vibration detection signal at a predetermined sampling frequency and to output a corresponding sampling weighing signal and sampling floor vibration detection signal having a phase difference from said sampling weighing signal due to a difference in the times at which said weighing signal and said floor vibration detection signal are alternately sampled by said sampling circuit;
   an A/D converter to convert said sampling weighing signal into a digital weighing signal and to convert said sampling floor vibration detection signal into a digital floor vibration detection signal having said phase difference from said digital weighing signal;
   a first digital filter to filter said digital weighing signal;
   a phase correcting circuit to cancel out said phase difference of said digital floor vibration detection signal and to output a corrected digital floor vibration detection signal having a same phase as said digital weighing signal;
   a second digital filter to filter said corrected digital floor vibration detection signal; and
   a vibration compensating circuit to subtract said filtered corrected digital floor vibration detection signal from said filtered digital weighing signal and to output a floor vibration compensated signal.

9. The weighing apparatus according to claim 8, wherein said phase correcting circuit cancels out said phase difference by simple-averaging values of said digital floor vibration detection signal.

10. A weighing apparatus comprising:
    a weighing cell to weigh an article and to output a weighing signal corresponding to a weight of said article;
    a floor vibration detecting cell to detect a vibration of a floor on which said weighing cell is installed and to output a corresponding floor vibration detection signal;
    sampling means for selectively sampling said weighing signal and said floor vibration detection signal at a predetermined sampling frequency and for outputting corresponding sampling signals;
    an A/D converter to convert each of said sampling signals into a corresponding digital weighing signal or digital floor vibration detection signal;
    first digital filtering means for filtering said digital weighing signal;
    second digital filtering means for filtering said digital floor vibration detection signal;

floor vibration compensating means for subtracting said filtered digital floor vibration detection signal from said filtered digital weighing signal and for outputting a corresponding floor vibration compensated signal which compensates for an error of said weighing signal caused by said floor vibration; and phase correcting means for nullifying a phase difference, caused by a difference in the times at which said weighing signal and said floor vibration detection signal are sampled by said sampling means, by applying a phase correction amount, corresponding to said phase difference, to said weighing signal or said floor vibration detection signal before or after filtering by the first and second filtering means.

11. The weighing apparatus according to claim 10, wherein said A/D converter and said sampling means are provided in a common digital converter.

12. The weighing apparatus according to claim 10, wherein said sampling means alternately samples said weighing signal and said floor vibration detection signal.

13. The weighing apparatus according to claim 10, wherein said phase correcting means determines said phase correction amount by simple-averaging said digital weighing signal or said digital floor vibration detection signal.

14. The weighing apparatus according to claim 13, wherein said phase correcting means performs said simple-averaging by simple-averaging pairs of consecutive values of said digital weighing signal or said digital floor vibration detection signal.

15. The weighing apparatus according to claim 10, wherein said predetermined sampling frequency is substantially larger than a frequency of said vibration of said floor.

16. The weighing apparatus according to claim 10, wherein said A/D converter is the only A/D converter in said weighing apparatus.

17. A weighing method comprising the steps of:
weighing an article and outputting a weighing signal;
detecting a vibration of a floor supporting said article and outputting a floor vibration signal;
selectively sampling said weighing signal and said floor vibration signal and outputting a corresponding sampling weighing signal and sampling floor vibration signal having a phase difference from each other due to a difference in times at which said weighing signal and said floor vibration signal are sampled; and
applying a phase correction to said sampling weighing signal or said sampling floor vibration signal to cancel out said phase difference and outputting a corrected sampling signal.

18. The weighing method according to claim 17, further comprising the step of determining said phase correction by simple-averaging said sampling weighing signal or said sampling floor vibration signal.

19. The weighing method according to claim 17, further comprising the step of outputting a floor vibration compensated signal based on said corrected sampling signal.

* * * * *